US008912883B2

(12) United States Patent
Kobres

(10) Patent No.: US 8,912,883 B2
(45) Date of Patent: Dec. 16, 2014

(54) TECHNIQUES FOR AUTOMATING RENTAL CAR TRANSACTIONS

(75) Inventor: Erick Kobres, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 891 days.

(21) Appl. No.: 12/913,427

(22) Filed: Oct. 27, 2010

(65) Prior Publication Data

US 2012/0105197 A1 May 3, 2012

(51) Int. Cl.
| | |
|---|---|
| *G06F 19/00* | (2011.01) |
| *G01C 21/26* | (2006.01) |
| *G08G 1/09* | (2006.01) |
| *H04Q 1/00* | (2006.01) |
| *G06Q 10/02* | (2012.01) |
| *G06Q 30/06* | (2012.01) |

(52) U.S. Cl.
CPC ............... *G06Q 10/02* (2013.01); *G06Q 30/06* (2013.01)
USPC .......................................... 340/5.72; 340/5.2

(58) Field of Classification Search
CPC .......... G06F 19/00; G01C 21/26; G08G 1/09; G06Q 40/00; H04L 9/32
USPC ............ 340/5.72, 5.2; 364/423.098; 701/200, 701/201, 209; 705/4, 1, 5, 26–27
See application file for complete search history.

(56) References Cited

U.S. PATENT DOCUMENTS

| | | | | | |
|---|---|---|---|---|---|
| 5,289,369 | A | * | 2/1994 | Hirshberg | 705/13 |
| 5,726,885 | A | * | 3/1998 | Klein et al. | 455/456.6 |
| 6,873,840 | B1 | * | 3/2005 | von Alten | 455/410 |
| 6,931,308 | B2 | * | 8/2005 | Read | 701/1 |
| 6,945,303 | B2 | * | 9/2005 | Weik, III | 160/188 |
| 6,988,034 | B1 | * | 1/2006 | Marlatt et al. | 701/516 |
| 7,177,738 | B2 | * | 2/2007 | Diaz | 701/29.3 |
| 7,737,865 | B2 | * | 6/2010 | Avidan | 340/932.2 |
| 7,902,978 | B2 | * | 3/2011 | Pederson | 340/541 |
| 8,019,629 | B1 | * | 9/2011 | Medina et al. | 705/4 |
| 8,370,268 | B2 | * | 2/2013 | Ehrman et al. | 705/307 |
| 2001/0037298 | A1 | * | 11/2001 | Ehrman et al. | 705/40 |
| 2001/0056361 | A1 | * | 12/2001 | Sendouda | 705/5 |
| 2002/0022979 | A1 | * | 2/2002 | Whipp et al. | 705/5 |
| 2002/0156553 | A1 | * | 10/2002 | Read | 701/1 |
| 2002/0184062 | A1 | * | 12/2002 | Diaz | 705/7 |
| 2002/0186144 | A1 | * | 12/2002 | Meunier | 340/825.28 |
| 2003/0125961 | A1 | * | 7/2003 | Janda | 705/1 |
| 2006/0155614 | A1 | * | 7/2006 | Woytowick et al. | 705/27 |
| 2010/0131304 | A1 | * | 5/2010 | Collopy et al. | 705/4 |
| 2010/0157061 | A1 | * | 6/2010 | Katsman et al. | 348/149 |

* cited by examiner

*Primary Examiner* — Nam V Nguyen
(74) *Attorney, Agent, or Firm* — Joseph P. Merhle

(57) ABSTRACT

A customer uses a wireless portable device to interact with a remote cloud-based car rental service. Details at check in are recorded and the customer is authorized to take possession of the car. At checkout, additional details are noted, a receipt is produced, and the customer leaves the car at the car facility. The check-in and checkout process can be achieved without any car rental attendant. That is, the customer via the wireless portable device and with the assistance of the remote cloud-based car rental service completely achieves check in and checkout for a car rental.

18 Claims, 3 Drawing Sheets

TECHNIQUES FOR AUTOMATING RENTAL CAR TRANSACTIONS

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition to this level automation transforming the industry, consumers are performing more and more transactions using their cell or smart phones. For example, consumers can not use bar codes or QR codes to check in through airport security, make purchases at point-of-sale terminals via their phones, check in to sporting events, and others.

One area that has really not experienced much automation for transactions via phones is the car rental industry.

One reason for this is that the traditional car-rental business processes must tradeoff between customer convenience, rental car company risk, and rental car company labor costs.

In attended environments, human attendants are typically used to perform simple tasks during check-out and check-in of rental cars, such as verification of the Vehicle Identification Number (VIN), mileage, fuel level, and checking for damage before and after a rental. This is expensive for the rental company, and can be slow for customers as they have to wait for an available attendant to check in and checkout.

In unattended environments, lack of human verification can lead to disputes between rental car companies and customers as a lack of data acquisition at the time of rental or return creates a situation where the "facts" from the customer and rental company perspective can be at odds. This can occur as a result of undocumented damage, incorrectly documented mileage or fuel level.

SUMMARY

In various embodiments, techniques for automated rental car transactions are presented. According to an embodiment, a method for automated a rental car check-in procedure is provided.

Specifically, a customer is instructed, via a wireless portable device of the customer, as to a location for taking possession of a car at a car rental facility. Next, a Vehicle Identification Number (VIN) for the car being rented is received back from the wireless portable device. Then, images or a video of items for the car, defined by a car rental agreement, are acquired from the wireless portable device. Finally, a confirmation is sent to the wireless portable device indicating that the customer can leave the car rental facility with the car to complete a car rental checkout transaction.

DETAILED DESCRIPTION

Figure 1:
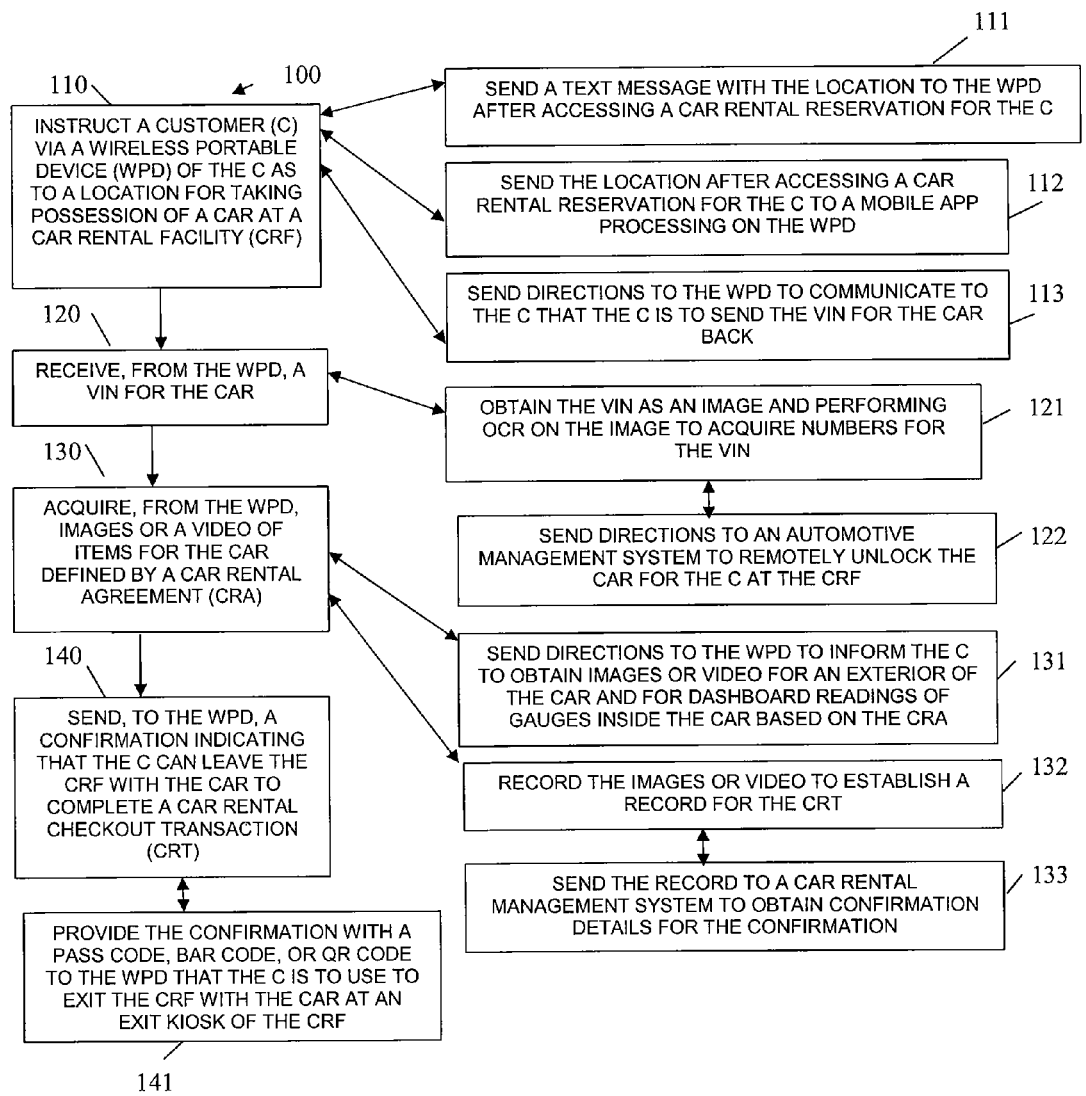
FIG. 1 is a diagram of a method for automated a car rental checkout procedure, according to an example embodiment.

FIG. 1 is a diagram of a method 100 for automated a car rental checkout procedure, according to an example embodiment. The method 100 (hereinafter "car rental checkout service") is implemented as instructions programmed and residing on a non-transitory computer-readable (processor-readable) storage medium and executed by one or more processors. The processors are specifically configured and programmed to process the car rental checkout service. The car rental checkout service operates over a network. The network is wired, wireless, or a combination of wired and wireless.

In an embodiment, the network is the Internet. In another embodiment, the network is a cellular network. It may also be that the network uses both the Internet and a cellular network. In an embodiment, the network is a private network provided via WiFi at the car rental facility and provided for purposes of securely accessing the car rental checkout service.

In an embodiment, the car rental checkout service executes on one or more processors over the network in a cloud processing environment.

Cloud computing is often defined as computing capabilities that provide an abstraction between computing resources and the underlying technical architecture (e.g., servers, storage, networks), enabling convenient, on-demand network access to a shared pool of configurable computing resources that can be rapidly provisioned and released with minimal management effort or service provider interaction. From the perspective of the user, where and how a computing resource is obtained is irrelevant and is transparent in cloud computing.

As used herein a "cloud processing environment" refers to a set of cooperating computing resources, such as machines, storage, software libraries, software systems, etc. that form a logical computing infrastructure.

So, the car rental checkout service is cloud or server based and interacts with a customer's cell phone, smart phone, tablet, Personal Digital Assistant (PDA), and other smart portable devices of the customer. These devices communicate a variety of information to the car rental checkout service for purposes of automating the car rental checkout process for a car rental company in the manners described herein and below.

In some cases, the customer's phone may include an application (often referred to as an "app" in smart phone parlance) that interacts with the car rental checkout service. An example of such an app is described below with reference to the FIG. 3.

As an overview of the embodiments that are described more particularly with reference to the FIG. 1, consider the following scenario that utilizes the car rental checkout service.

A customer is directed to a specific car or row of cars by the mobile application on the customer's phone and communicating with the car rental checkout service. It may also be that the customer has an itinerary already that indicates where the customer's car is located (parking space number). The car rental checkout service instructs the customer to frame the VIN on the car in a receptacle displayed by the mobile app. Alternatively, a text message sent by the car rental checkout service tells the customer to active the customer's bar code scanner on phone and to the scan the VIN. It may also be that a picture is taken if the phone does not have a native bar code scanner.

At this time, the mobile app on the phone or the car rental checkout service recognizes either the barcode or characters that comprise the VIN, and records that the customer is taking possession of this car particular car with this VIN. Here, the mobile app can send the VIN to the car rental checkout service or the customer can be instructed to send an image of the VIN to a particular number monitored by the car rental checkout service.

The car rental checkout service then remotely unlocks the car through OnStar® or similar auto management infrastructure based on verification of the reservation.

Next, the customer is instructed (via the mobile app or text messages sent by the car rental checkout service) to perform a walk-around of the car with the camera of the phone framing the car as a 360-degree video or a as series of still images. The app or car rental checkout service stores the images, location and time as a video record of any pre-existing damage to the car. In the case of the app storing, the app sends to the car rental checkout service on behalf of the customer. Without the app, the customer is instructed to send to a number monitored by the car rental checkout service or instructed to upload to a predefined site monitored by the car rental checkout service.

Next the customer is instructed (via text messages or the app in communication with the car rental checkout service) to start the car and frame the dash-board in the app provided receptacle (or using the phone's camera application). The mobile app or the car rental checkout service recognizes the car's fuel gauge and odometer readings through optical recognition software and notes these values along with the location and time of the photo and confirms the value with the customer. In the case where there is no mobile app, the car rental checkout service instructs the customer via a text message to send the image of the gauges via a text to a phone number monitored by the car rental checkout service or to upload the image of the gauges to a site monitored by the car rental checkout service.

For added security, the customer may also be asked to enter, via an app or via a text message sent, the license number of the customer.

Optionally, as well, a QR code or pass code may be sent by the car rental checkout service to the phone of the customer. The QR code can be scanned at an exit kiosk of the car rental facility for the customer to exist a locked gate; or the customer enters a pass code at the exit kiosk for the locked gate to unlock. It is noted that other imaged-based tags may be provided besides just a QR code, such as but not limited to Aztec, DataMatrix, MaxiCode, and others. Thus, any imaged-based tags can be used.

The above description provides a sample overview of some of the embodiments capable with the teachings presented herein. The actions of the mobile app or actions initiated by the customer via a smart wireless mobile device are described below with reference to the FIG. 3. The car rental checkout service is described now with reference to the FIG. 1. That is, the processing actions of the car rental checkout service are described in the FIG. 1 as it interacts with either a mobile app on the customer's portable device or as it interacts directly with existing features of the customer's portable device.

At 110, the car rental checkout service instructs a customer, via a wireless portable device (such as a smart phone, cell phone, tablet, PDA, etc.), of the customer to a location for taking possession of a car at a car rental facility. This instruction can occur in a variety of manners.

For example, at 111, the car rental checkout service sends a text message with the location for the car to the wireless portable device after accessing a car rental reservation for the customer.

In another situation, at 112, the car rental checkout service sends the location after accessing a car rental reservation for the customer to a mobile app processing on the wireless portable device. This may entail consulting a car rental reservation system or it may entail accessing a registered itinerary associated with the customer having the car rental reservation.

In yet another case, at 113, the car rental checkout service sends directions to the wireless portable device to communicate to the customer that the customer is to send the VIN for the car at the location back to the car rental checkout service. Examples of what format the VIN is sent in and how it is sent from the wireless portable device was presented above and some of these are also discussed below.

At 120, the car rental checkout service receives, from the wireless portable device, a VIN for the car. Again, this can occur in a variety of manners.

For example, at 121, the car rental checkout service obtains the VIN as an image, which the car rental checkout service then performs Optical Character Recognition (OCR) on the image for purposes of acquiring the serial numbers for the VIN, which uniquely identifies the car.

As discussed above, it may also be that a mobile app on the wireless portable device of the customer performs the OCR on behalf of the car rental checkout service and sends the serial numbers over the network to the car rental checkout service.

Again, it should also be noted that the VIN may be in the form of a bar code that permits a bar code scanner and reader on the wireless portable device to scan and read and then send to the car rental checkout service. The mobile app, if one exists, can also be equipped with a bar code reader or scanner and can likewise send to the car rental checkout service.

Continuing with the embodiment of 121 and at 122, the car rental checkout service sends directions to an automotive management system (such as OnStar® and others) to remotely unlock the car for the customer at the location of the car rental facility. Here, the keys for the car are in the ignition or in the glove box or some other location within the car that the customer is informed of once the car is unlocked.

At 130, the car rental checkout service acquires, from the wireless portable device, images or video of items for the car defined by a car rental agreement. Again, these directions can be in the form of text messages to the wireless portable device or via an Application Programming Interface (API) set of commands or messages send to a mobile app processing on the wireless portable device.

According to an embodiment, at 131, the car rental checkout service sends directions to the wireless portable device to inform the customer to obtain the images or video for an exterior of the car and for dashboard readings of gauges (fuel gauge, mileage odometer, etc.) inside the car in accordance with the car rental agreement. The exterior images or video is a 360 degree view of the car.

In an embodiment, at 132, the car rental checkout service records the images or video to establish a record for the car rental transaction between the car rental company and the customer. If a mobile app exists, it may automatically retain the images for the customer on the wireless portable device as well should a dispute about preexisting damage arise when the customer checks the car back in after the car rental period. Alternatively, the customer can be informed via a text message to the wireless portable device to retain the images or video for the customers on records should a later dispute arise.

Continuing with the embodiment of 132 and at 133, the car rental checkout service sends the record to a car rental management system to obtain confirmation details for a confirmation permitting the customer to exit the car rental facility with the car.

At 140, the car rental checkout service sends to the wireless portable device a confirmation that indicates that the customer can now leave the car rental facility with the car to complete the car rental checkout transaction.

According to an embodiment, at 141, the car rental checkout service provides the confirmation with a pass code, a bar code, a QR code, or other image-based tags to the wireless portable device that the customer is to use to exit the car rental facility with the car at an exit kiosk of the car rental facility.

It is now apparent how an entirely unmanned car rental facility can be configured using the techniques described herein above and below (below describing the automated check-in procedures). This is entirely automated. For security a sole security guard can exist at the car rental facility or a minimal level of staff present to clean and prep the cars and assist customers with questions, etc. But, a substantial amount of car rental staff can be reduced with the automated techniques described herein. The staff reduced could be used for purposes of opening new car rental facilities that were not previously economically feasible for a car rental company. So, the same amount of staff that exists today can be used to support more facilities to enhance revenue while maintaining expenses.

Figure 2:
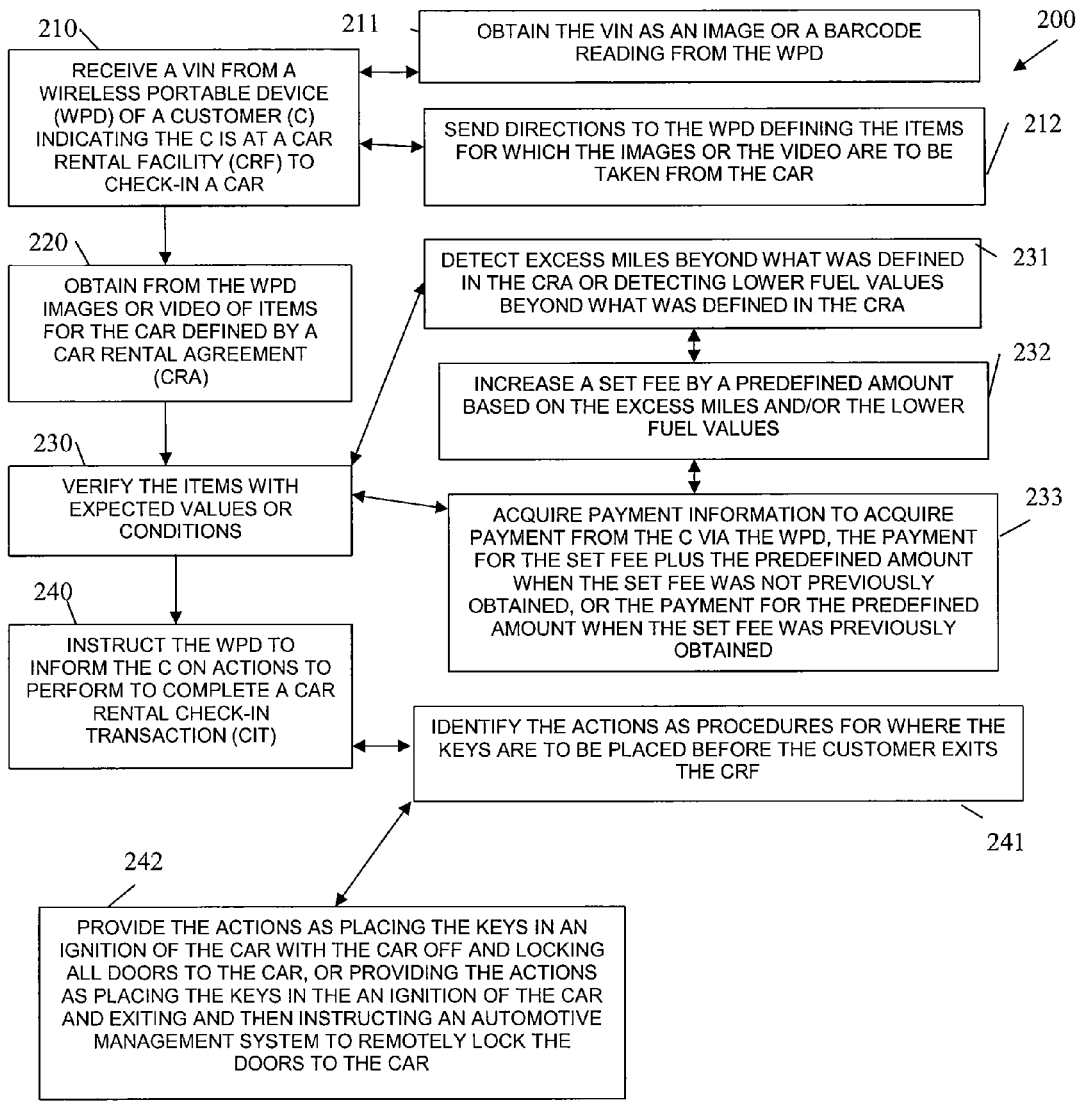
FIG. 2 is a diagram of a method for automated a car rental check-in procedure, according to an example embodiment.

FIG. 2 is a diagram of a method 200 for automated a car rental check-in procedure, according to an example embodiment. The method 200 (hereinafter "car rental check-in service") is implemented as instructions and programmed within a non-transitory computer-readable (processor-readable) storage medium that executes on one or more processors on a server or a cloud processing environment; the processors of the server or cloud processing environment are specifically configured to execute the car rental check-in service. The car rental check-in service is operational over a network; the network is wired, wireless, or a combination of wired and wireless.

In an embodiment, the network is the Internet. In another case, the network is a cellular network. It may also be that the network uses both the Internet and a cellular network. In an embodiment, the network is a private network provided via WiFi at the car rental facility and provided for purposes of securely accessing the car rental check-in service.

The car rental check-in service again describes the processing actions of the car rental check-in service from the perspective of the server of the cloud-processing environment. The processing is associated with the car rental check-in process whereas the method 100 of the FIG. 1 focused on the car rental checkout process.

Again, a brief overview of some of the embodiments that are provided by the car rental check-in service is provided first before specific discussion of the automated car rental check-in process is presented.

The customer uses the mobile app (described below with reference to the FIG. 3) or receives instructions from the car rental check-in service to indicate that he/she is now returning the car. The customer is instructed to start the car and take a picture of the dash-board in the. The mobile application or car rental check-in service recognizes the car's fuel gauge and odometer readings through optical recognition software and notes these values along with the location and time of the photo and confirms the values with the customer.

Next, the customer is instructed to perform a walk-around of the car with the camera of the customer's wireless portable device framing the car as a 360-degree video or as a series of still images. The app or server stores the images, location and time as a video record of any new damage to the car.

Finally, the customer is instructed as to where to return keys—or whether to lock them in the car—and then instructed to frame the VIN in a receptacle displayed by the app or instructed to do this via the camera app of the portable wireless device. At this time, the mobile app or server recognizes either the barcode or characters that comprise the VIN, and records that the customer has returned this car. As noted above with the overview presented with the FIG. 1, it may also be that the mobile app scans the VIN itself using a barcode scanner of the app or the customer uses a bar code scanner native to the portable wireless device.

Optionally the car rental check-in service remotely locks the car through the auto management infrastructure, completing the transaction.

The car rental check-in service then transmits an electronic receipt to the app, completing the customer's rental. The car rental check-in service can also send the receipt as a text message or email to the wireless portable device of the customer.

Again, the FIG. 2 describes the processing of the car rental check-in service from the cloud processing environment and the interactions from the wireless portable device can occur via a customized mobile app or can occur via interactions between the customer, via the wireless portable device, and the car rental check-in service with the customer and the car rental check-in service using native features of the wireless portable device.

At 210, the car rental check-in service receives a VIN from a wireless portable device (cell phone, smart phone, tablet, PDA, etc.) of a customer indicating that the customer is at the car rental facility to check-in a car associated with a car rental agreement.

According to an embodiment, at 211, the car rental check-in service obtains the VIN as an image or a barcode reading from the wireless portable device. Again, this can be sent via text message or uploaded to a site by the customer via the wireless portable device; or this can be sent by a mobile app processing on the wireless portable device and communicating with the car rental check-in service over the network.

In an embodiment, at 212, the car rental check-in service sends directions to the wireless portable device that defines the items for which the images or the video are to be taken from the car.

So, at 220, the car rental check-in service obtains from the wireless portable device the images or video of the items for the car, which are defined by a car rental agreement.

At 230, the car rental check-in service verifies the items with expected values or conditions.

According to an embodiment, at 231, the car rental check-in service detects excess miles beyond that which was defined in the car rental agreement or detects lower fuel values beyond what was defined in the car rental agreement.

Continuing with the embodiment of 231 and at 232, the car rental check-in service increases a set fee by a predefined amount based on the excess miles and/or based the lower fuel values.

Continuing with the embodiment of 232 and at 233, the car rental check-in service acquires payment information to obtain payment from the customer via the wireless portable device. The payment is for a set fee (pursuant to the rental agreement) plus the predefined amount when the set fee was not previously obtained. Alternatively, the payment is for the predefined amount when the set fee was previously obtained from the customer.

In some cases, at 230, the car rental check-in service verifies the items with expected values or conditions. Images or video associated with the car for the exterior (exterior items) may include minor damage that is subsequently ascertained by manual inspection of the photos. In which case, the customer is subsequently contacted by the car rental company for payment associated with the minor damages. In other cases, more severe damages may be detected via automated image processing that compares the current sent images or video with prior retained images or video (acquired at checkout). In these situations, an agent of the car rental company may be automatically contacted to immediately contact the customer or to notify an agent at the car rental facility to contact the customer to discuss the situation and inspect the vehicle.

At 240, the car rental check-in service instructs the wireless portable device to inform the customer on actions to perform to complete a car rental transaction.

For example, at 241, the car rental check-in service identifies the actions as procedures for where the keys are to be placed before the customer exits the car rental facility (such as a drop box or as discussed below).

Continuing with the embodiment at 241 and at 242, the car rental check-in service provides the actions as directions for placing the keys in the ignition of the car with the car turned off and having the customer lock all doors to the car. Alternatively, the car rental check-in service provides the actions as directions for placing the keys in the ignition and then the car rental check-in service instructs an automotive management system (such as OnStar® and others) to remotely lock the doors to the car.

It should now be apparent how car rental checkouts and check-ins can be entirely automated using the cloud-based services described herein in connection with a customer's wireless portable device.

Figure 3:
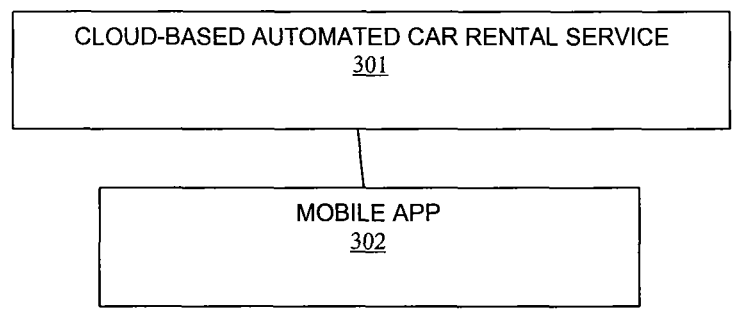
FIG. 3 is a diagram of an automated rental car rental transaction system, according to an example embodiment.

FIG. 3 is a diagram of an automated rental car rental transaction system 300, according to an example embodiment, according to an example embodiment. The automated rental car rental transaction system 300 includes one or more processors that are specifically configured to perform, inter alia, the processing associated with the methods 100 and 200 of the FIGS. 1 and 2, respectively. The automated rental car rental transaction system 300 may also include a variety of other hardware components, such as network adapters, memory, display screen(s), input mechanisms, and the like. Furthermore, the automated rental car rental transaction system 300 is operational over a network and the network can be wired, wireless, or a combination of wired and wireless. In an embodiment, the network is the Internet. In another case, the network is a cellular network. It may also be that the network uses both the Internet and a cellular network.

The rental car rental transaction system 300 includes a cloud-based automated car rental service 301 and a mobile app 302. Each of these and their interactions with one another will now be discussed in turn.

One or more processors in a cloud-processing environment are configured to execute the cloud-based automated car rental service 301. The cloud-based automated car rental service 301 is resides and is programmed in a non-transitory computer-readable storage medium and again executes on the one or more processors of the cloud-processing environment. Example processing features associated with the cloud-based automated car rental service 301 were presented above in detail with reference to the FIGS. 1 and 2.

The cloud-based automated car rental service 301 is configured to interact with the mobile app 302 that processes on a customer's wireless portable device (cell phone, smart phone, tablet, PDA, etc.). This is done for purposes of automating a car rental check-in transaction and a car rental checkout transaction without the aid of car rental personnel (as described in detail above with reference to the methods 100 and 200 of the FIGS. 1 and 2, respectively).

The mobile app 302 resides within and is programmed in a non-transitory computer readable medium and is adapted to be downloaded and installed on a wireless portable device of a customer, such as a cellular phone, a smart phone, a tablet, a PDA, and the like. The wireless portable device includes one or more processors that execute the mobile app 302. Some features of the mobile app 302 were presented in the overview sections discussed above with reference to the FIGS. 1 and 2.

The mobile app 302 is configured to acquire details requested by the cloud-based automated car rental service 301 for assisting the customer, via instructions obtained from the cloud-based automated car rental service 301 and via automated features and interfaces of the mobile app 302. Such automated features can include, but are not limited to, retaining images, video, car rental agreements, etc. for the customer on the customer's wireless portable device. Such, interfaces can include, but are not limited to, screen interfaces on the wireless portable device that help gather details via customer-driven screens and the like and that help instruct the customer as to what is needed to satisfy the cloud-based automated car rental service 301.

In an embodiment, the mobile app 302 is downloaded from a mobile app store by the customer and installed on the wireless portable device prior to transacting with the cloud-based automated car rental service 301. The download may be free or a small fee may be charged for the download.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors configured to execute the method, comprising:

instructing a customer via a wireless portable device of the customer as to a location for taking possession of a car at a car rental facility;

receiving, from the wireless portable device, a vehicle identification number (VIN) for the car;

acquiring, from the wireless portable device, a video of items for the car defined by a car rental agreement from a walk around performed by the customer and sending directions to the wireless portable device to inform the customer to obtain with the video an exterior of the car and dashboard readings of gauges inside the car based on the car rental agreement; and sending, to the wireless portable device, a confirmation indicating that the customer can leave the car rental facility with the car to complete a car rental checkout transaction.

2. The method of claim 1, wherein instructing further includes sending a text message with the location to the wireless portable device after accessing a car rental reservation for the customer.

3. The method of claim 1, wherein instructing further includes sending the location after accessing a car rental reservation for the customer to a mobile app processing on the wireless portable device.

4. The method of claim 1, wherein instructing further includes sending directions to the wireless portable device to communicate to the customer that the customer is to send the VIN for the car back to the method.

5. The method of claim 1, wherein receiving further includes obtaining the VIN as an image and performing optical character recognition on the image to acquire numbers for the VIN.

6. The method of claim 5, wherein obtaining further includes sending directions to an automotive management system to remotely unlock the car for the custom at the car rental facility.

7. The method of claim 1, wherein acquiring further includes recording the video to establish a record for the car-rental checkout transaction.

8. The method of claim 7, wherein recording further includes sending the record to a car rental management system to obtain confirmation details for the confirmation.

9. The method of claim 1, wherein sending further includes providing the confirmation with a pass code, bar code, or a Quick Response code to the wireless portable device that the customer is to use to exit the car rental facility with the car at an exit kiosk of the car rental facility.

10. A processor-implemented method programmed in a non-transitory processor-readable medium and to execute on one or more processors configured to execute the method, comprising:
receiving a Vehicle Identification Number (VIN) from a wireless portable device of a customer indicating the customer is at a car rental facility to check-in a car;
obtaining from the wireless portable device video of items for the car defined by a car rental agreement from a walk around performed by the customer, and sending directions to the wireless portable device to inform the customer to provide with the video an exterior of the car and dashboard readings of gauges inside the car based on the car rental agreement;
verifying the items with expected values or conditions; and
instructing the wireless portable device to inform the customer on actions to perform to complete a car rental check-in transaction.

11. The method of claim 10, wherein receiving further includes obtaining the VIN as an image or a barcode reading from the wireless portable device.

12. The method of claim 10, wherein verifying further includes detecting excess miles beyond what was defined in the car rental agreement or detecting lower fuel values beyond what was defined in the car rental agreement.

13. The method of claim 12, wherein detecting further includes increasing a set fee by a predefined amount based on the excess miles and/or the lower fuel values.

14. The method of claim 13, wherein instructing further includes acquiring payment information to acquire payment from the customer via the wireless portable device, the payment for the set fee plus the predefined amount when the set fee was not previously obtained, or the payment for the predefined amount when the set fee was previously obtained.

15. The method of claim 10, wherein, instructing further includes identifying the actions as procedures for where the keys are to be placed before the customer exits the car rental facility.

16. The method of claim 15, wherein identifying further includes providing the actions as placing the keys in an ignition of the car with the car off and locking all doors to the car, or providing the actions as placing the keys in the an ignition of the car and exiting and then instructing an automotive management system to remotely lock the doors to the car.

17. A system, comprising:
one or more processors in a cloud-processing environment having a cloud-based automated car rental service, the cloud-based automated car rental service resides and is programmed in a non-transitory computer-readable storage medium and executes on the one or more processors of the cloud-processing environment; and
a mobile app that resides within and is programmed in a non-transitory computer readable medium and is adapted to be downloaded and installed and executed on a wireless portable device of a customer;
the cloud-based automated car rental service configured to interact with the mobile app on the wireless portable device to automate a car rental check-in transaction and a car rental checkout transaction without the aid of car rental personnel, the cloud-based automated car rental service verifies the customer and receives a video for a walk around performed by the customer, and cloud-based automated car rental service also configured to send directions to the customer to provide with the video an exterior of a car and dashboard readings of gauges inside the car based on a car rental agreement.

18. The system of claim 17, wherein mobile app is configured to acquire details requested by the cloud-based automated car rental service by assisting the custom via instructions obtained from the cloud-based automated car rental service and via automated features and interfaces of the mobile app.

* * * * *